(12) United States Patent  (10) Patent No.: US 7,424,342 B2
Beniyama et al.  (45) Date of Patent: Sep. 9, 2008

(54) TRANSPORT SYSTEM

(75) Inventors: Fumiko Beniyama, Yokohama (JP);
Toshio Moriya, Tokyo (JP); Nobutaka Kimura, Yokohama (JP); Kosei Matsumoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 134 days.

(21) Appl. No.: 11/646,381

(22) Filed: Dec. 28, 2006

(65) Prior Publication Data
US 2008/0066207 A1  Mar. 13, 2008

(30) Foreign Application Priority Data
Sep. 13, 2006 (JP) ............... 2006-247481

(51) Int. Cl.
*G06F 19/00* (2006.01)
(52) U.S. Cl. ............. 700/245; 700/247; 700/248; 700/250; 700/251; 318/568.1; 318/568.11; 318/568.14; 318/568.16; 318/568.21; 901/4; 901/43; 901/47
(58) Field of Classification Search ............ 700/245, 700/247, 248, 250, 251, 252, 253, 254, 255, 700/257, 259, 260, 262, 264; 318/568.1, 318/568.11, 568.14, 568.16, 568.21, 568.23; 901/4, 43, 47
See application file for complete search history.

(56) References Cited

U.S. PATENT DOCUMENTS

| 5,653,005 | A  | * | 8/1997 | Speller et al. ............. 29/701 |
| 6,163,946 | A  | * | 12/2000 | Pryor ................. 29/407.04 |
| 6,167,607 | B1 | * | 1/2001 | Pryor ................. 29/407.04 |
| 6,301,763 | B1 | * | 10/2001 | Pryor ................. 29/407.04 |
| 6,314,631 | B1 | * | 11/2001 | Pryor ................. 29/407.04 |
| 6,415,204 | B1 | * | 7/2002 | Hirabayashi et al. ....... 700/245 |

FOREIGN PATENT DOCUMENTS

JP  2001-300876  10/2001

* cited by examiner

*Primary Examiner*—Khoi H. Tran
*Assistant Examiner*—McDieunel Marc
(74) *Attorney, Agent, or Firm*—Antonelli, Terry, Stout & Kraus, LLP.

(57) ABSTRACT

A computer in a transport system includes: a shooting part for shooting a first calibration tray by controlling a camera; a tray position computing part for computing a tray position of the first calibration tray within a captured image which the shooting part shot; a hand position acquisition part for acquiring a hand position indicative of a position of the hand robot of when the hand robot installs onto the first calibration tray a first transported article used for calibration; a calibration part for computing a calibration data based on the tray position and the hand position; and a transported article installing part which, when the mobile robot reached a predetermined arrival area, controls, based on the calibration data, the hand robot so as to install a second transported article onto a second tray, the second tray which the mobile robot being provided with.

10 Claims, 14 Drawing Sheets

TRANSPORT SYSTEM

INCORPORATION BY REFERENCE

The present application claims priority from Japanese application JP2006-247481 filed on Sep. 13, 2006, the content of which is hereby incorporated by reference into this application.

BACKGROUND OF THE INVENTION

The present invention relates to a transport system using a mobile robot (hereinafter, abbreviated as a robot).

The conventional system using a robot includes the function to transport articles to a customer's seat from a place (kitchen, or the like) where meals and drinks are provided. This robot transports meals and drinks, receives an order by means of a touch panel, moves along a guide, such as a marker and a rail, and travels away from obstacles (see JP-A-2001-300876).

SUMMARY OF THE INVENTION

In JP-A-2001-300876, although the portion for transporting articles from a kitchen or the like to a customer's seat is described, the portion for installing the transported articles, such as meals and drinks, onto a robot is not taken into consideration.

In transporting articles, such as drinks, for which the stability is required at the time of transporting, the transported articles need to be installed precisely onto a tray which the robot is provided with, however, because an error is most likely to occur at the arrival position of the robot, the installation of the transported article are still carried out through man power Then, the present invention is intended to provide a system capable of installing, without through man power, a transported article onto a robot which causes an error at its arrival position.

In order to solve the above-described problem, one of the preferred embodiments of the present invention is as follows.

In a transport system including a mobile robot, and a computer coupled to a camera and a hand robot, the computer includes: a shooting part for shooting a first calibration tray by controlling the camera; a tray position computing part for computing a tray position of the first calibration tray within a captured image which the shooting part shot; a hand position acquisition part for acquiring a hand position, the hand position indicating the position of a hand robot of when the hand robot installs onto the first calibration tray a first transported article used for calibration; a calibration part for computing a calibration data based on the tray position and the hand position; and a transported article installing part which, when the mobile robot reached a predetermined arrival area, controls the hand robot so as to install a second transported article onto a second tray based on the calibration data, the second tray which the mobile robot being provided with.

Other objects, features and advantages of the invention will become apparent from the following description of the embodiments of the invention taken in conjunction with the accompanying drawing.

DESCRIPTION OF THE EMBODIMENTS

Hereinafter, embodiments of the present invention will be described with reference to the accompanying drawings.

Figure 1:
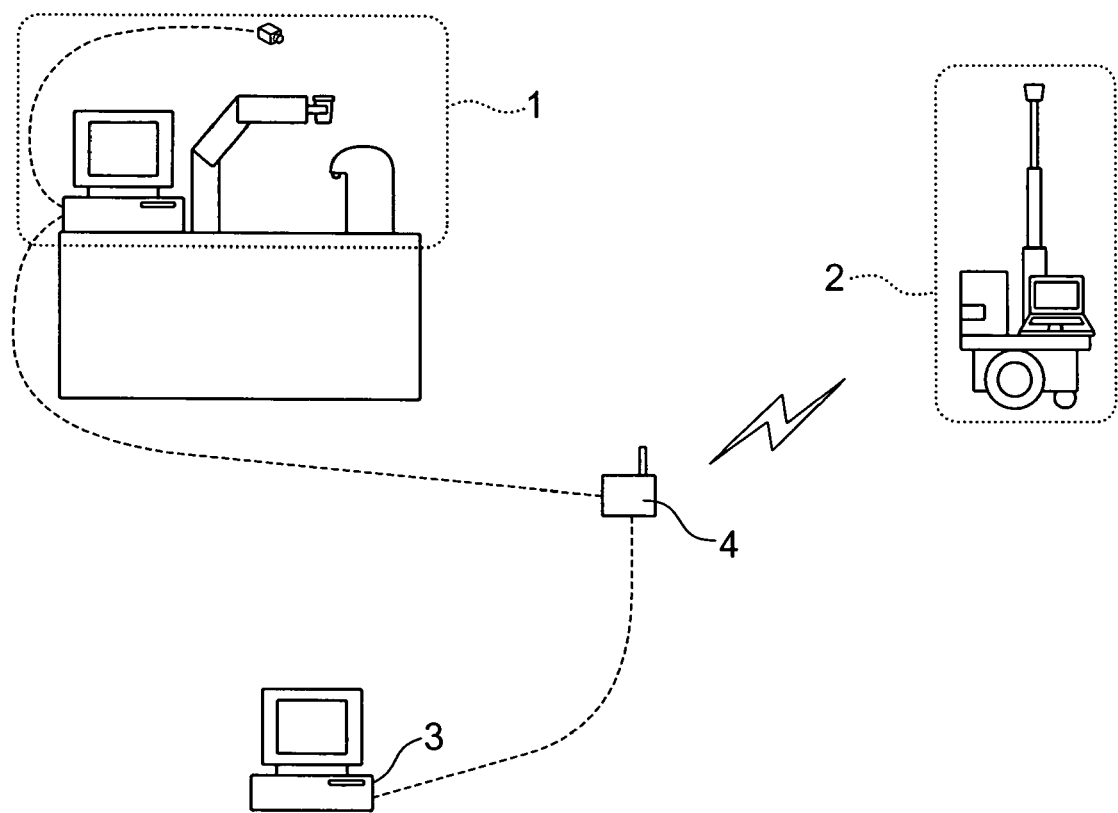
FIG. 1 is a view showing a system configuration.

FIG. 1 is a view showing the system configuration of this embodiment.

This system comprises a transported article supply equipment 1, a robot 2, a transport instruction computer 3, and a transponder 4. The transported article supply equipment 1 and transport instruction computer 3 are coupled to the transponder 4 by wire or by air, and the robot 2 is coupled to the transponder 4 by air.

Figure 2A:
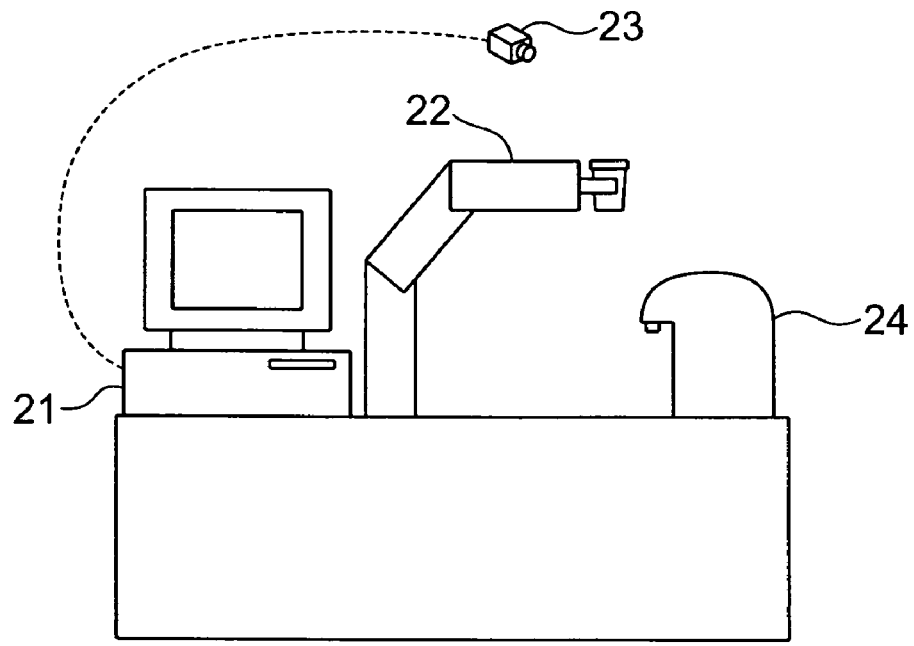
FIG. 2A is a view showing the configuration of a transported article supply equipment 1 when viewed from a lateral position.
Figure 2B:
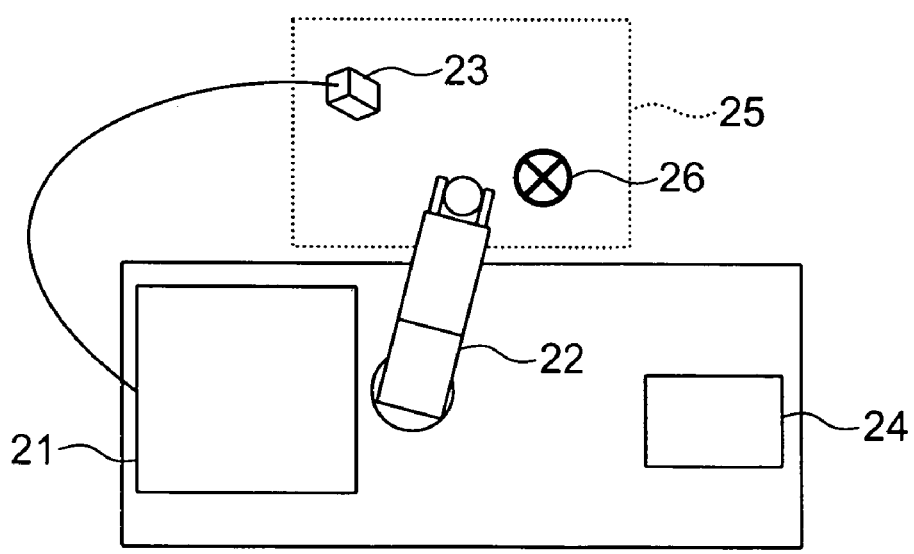
FIG. 2B is a view showing the configuration of the transported article supply equipment 1 when viewed from right above.

FIG. 2A and FIG. 2B are views showing the configuration of the transported article supply equipment 1. FIG. 2A is a view showing the transported article supply equipment 1 when viewed from a lateral position. FIG. 2B a view showing the transported article supply equipment 1 when viewed from right above.

The transported article supply equipment 1 comprises a computer 21, a hand robot 22 (hereinafter, abbreviated as a hand), a camera 23, and a transported article server 24 (e.g., a pot or the like for preparing drinks when the transported articles are drinks). Reference numeral 25 represents a predetermined arrival area of the robot 2, and the predetermined arrival area exists within the movable range of the hand 22. The position and angle at which the camera 23 is attached are not limited in particular as long as the shooting of the predetermined arrival area 25 is possible. Reference numeral 26 represents an area where a tray to be installed onto the robot 2 stops.

Figure 3:
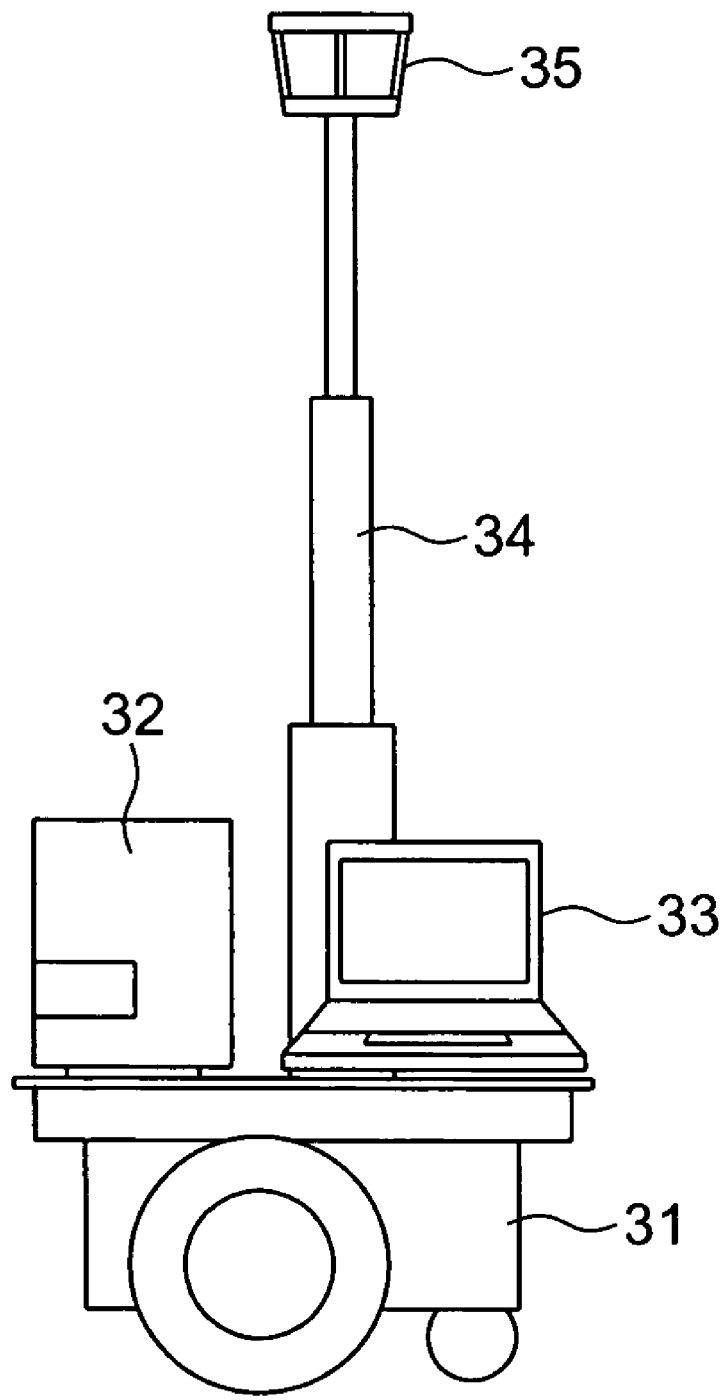
FIG. 3 is a view showing the configuration of a robot 2.

FIG. 3 is a view showing the configuration of the robot 2.

The robot 2 comprises a movable cart 31, a sensor 32 for measuring the distance to an obstacle using a laser or the like, a robot computer 33 for controlling the robot and the sensor, a telescopic controllable pole 34 for adjusting the height, and a tray 35 in which a transported article is installed.

Figure 4:
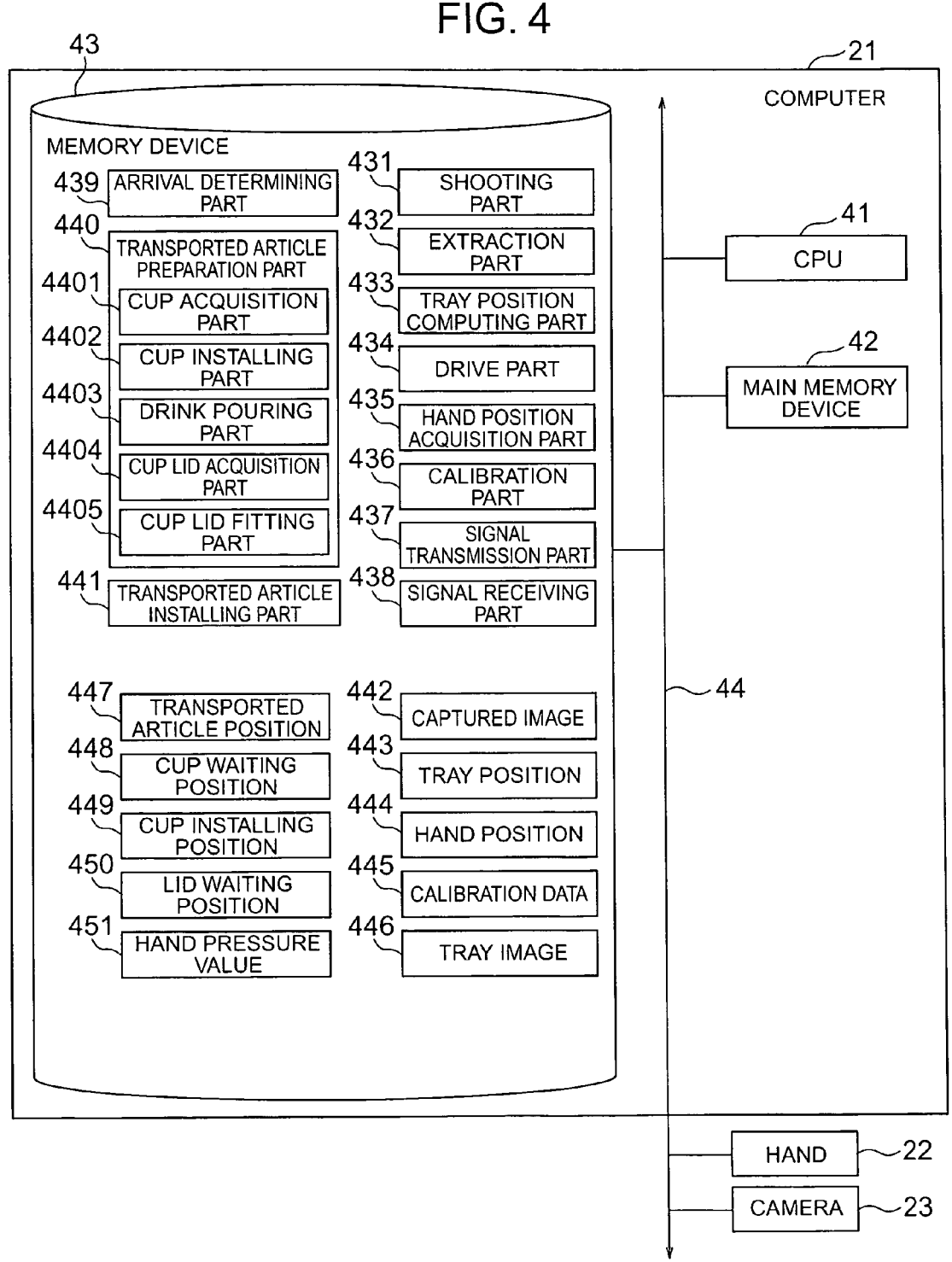
FIG. 4 is a view showing the hardware configuration of a computer 21 of the transported article supply equipment 1.

FIG. 4 is a view showing the hardware configuration of the computer 21 of the transported article supply equipment 1.

The computer 21 comprises a CPU 41, a main memory device 42, a memory device 43 such as a hard disk, and a bus 44 for coupling these components to each other. Moreover, the hand 22 to operate under control of the CPU 41, and the camera 23 are coupled via the bus 44.

The memory device 43 stores programs such as, a shooting part 431 for shooting an area by controlling the camera 23 and preparing a captured image 442 (to be described later), an extraction part 432 for extracting a tray portion within the captured image 442, a tray position computing part 433 for computing a tray position 443 (to be described later) in a camera coordinate system (to be described later), a drive part 434 for driving the hand 22, a hand position acquisition part 435 for acquiring a hand position 444, a calibration part 436 for computing a calibration data 445 (to be described later), a signal transmission part 437 for transmitting various signals, a signal receiving part 438 for receiving various signals, an arrival determining part 439 for determining that the robot 2 has arrived, a transported article preparation part 440 which prepares for installing a transported article in the robot 2, and a transported article installing part 441 for installing a transported article onto the tray 35 by controlling the hand 22. The memory device 43 further stores data such as, the captured image 442 which the camera 23 shot, the tray position 443 indicative of a representative position of the tray 35 in the camera coordinate system, the hand position 444 indicative of the position of the hand 22 in a hand coordinate system (to be described later) when the hand 22 installs a transported article onto the tray 35, a calibration data 445 which is a value for calculating a relative relationship between the coordinate system in the camera coordinate system and the coordinate system in the hand coordinate system, a tray image 446 indicative of a data extracted from the tray portion within the captured image 442, a transported article position 447 indicative of the position of a transported article in the hand coordinate system (the position of the transported article server 24 when the transported articles are drinks), a cup waiting position 448 indicative of a position in which an empty cup in the hand coordinate system is placed, a cup installation position 44.9 indicative of a cup installation position under the transported article server 24 in the hand coordinate system, a lid waiting position 450 indicative of a position where a lid is located in the hand coordinate system, and a hand pressure value 451 indicative of a pressure value of the hand 22 (a pressure at the time of grasping an empty cup, a pressure at the time of grasping a lid, and a pressure at the time of grasping a cup containing a drink, or the like).

The transported article preparation part 440 includes the following programs: a cup acquisition part 4401 which controls so as to move the hand 22 to the cup waiting position 448 and grasp a cup by the fingertips of the hand 22 in accordance with the hand pressure value 451; a cup installing part 4402 which controls so as to install a cup grasped by the hand 22 in the transported article position 447; a drink pouring part 4403 which controls the hand 22 so as to cause the transported article server 24 to carry out an operation of pouring a drink; a cup lid acquisition part 4404 which controls so as to move the hand 22 to the lid waiting position 450 and grasp a lid with the fingertips of the hand 22; and a cup lid fitting part 4405 for controlling so as to fit a lid on a cup, and the like. These programs are used when the transported articles are drinks.

The CPU 41 carries out various processings by reading to the main memory device 42 a program stored in the memory device 43 and carrying out the same. These programs and data may be stored in the memory device 43 in advance, or may be inputted from a storage media, such as a CD-ROM, or may be downloaded from other device via a network. Moreover, the function accomplished by the program may be accomplished by a dedicated hardware. This is also true of the transport instruction computer 3 and the robot computer 33 as described later.

In addition, although in this specification the description may be made as if the processing entity is the program, it is clear that the entity, when the processing is accomplished by means of the software, is a CPU which carries out the program.

Figure 5:
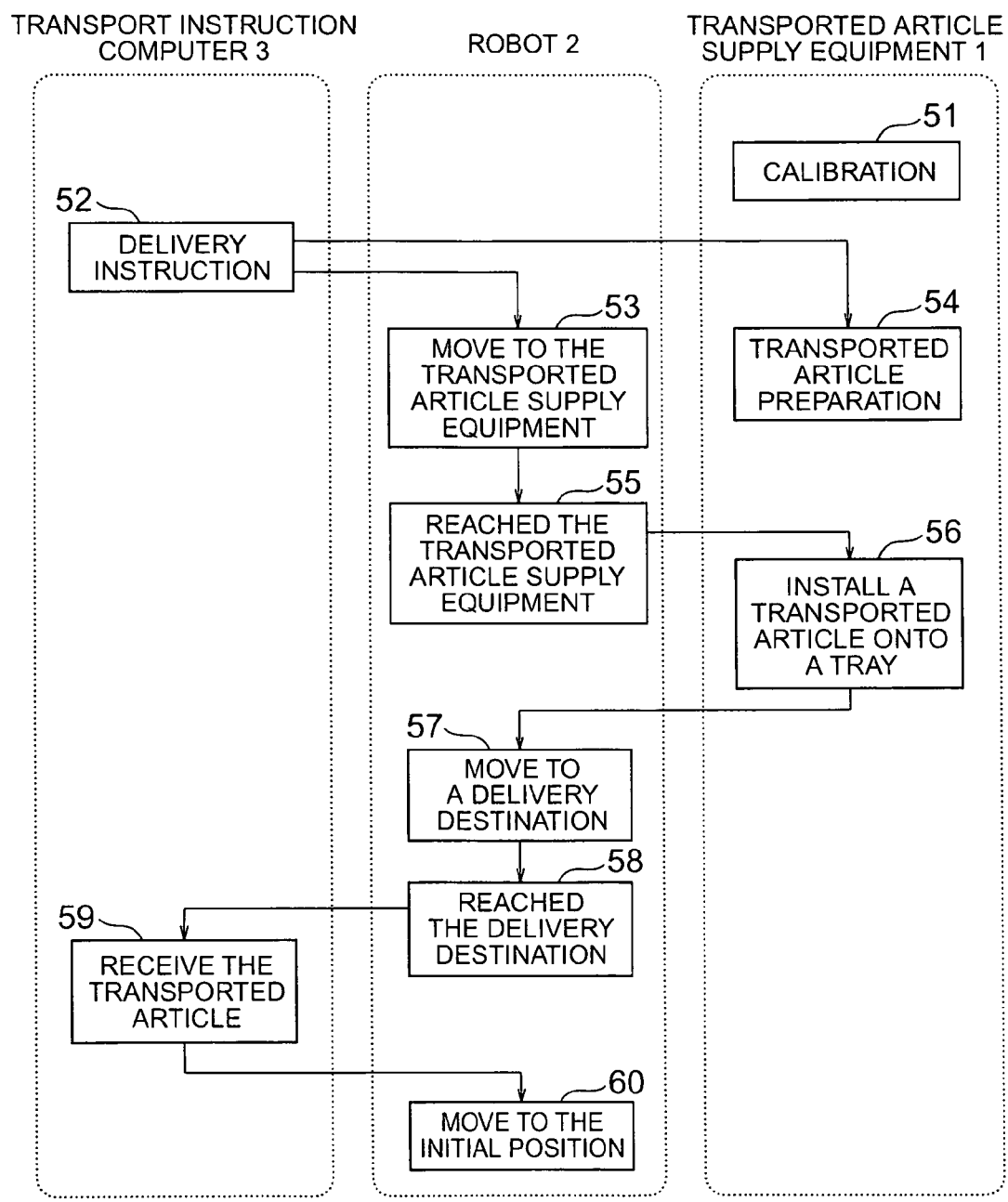
FIG. 5 is a flow chart of this system.

FIG. 5 is the flow chart of this system.

First, in the transported article supply equipment 1, calibration is carried out in advance (Step 51). Here, the calibration indicates that a calibration data for computing the hand position 444 based on the captured image 442, which the camera 23 shot, is computed in advance, so that a transported article may be installed onto the tray 35 even if the robot 2 stops at different places on different occasions (it is difficult to stop the robot 2 precisely at a specific place, and an error of several centimeters may occur).

In addition, although a method may be considered in which an arrival position error of the robot 2 is absorbed by enlarging the tray 35, this method is not desirable because, if done this way, a risk that a transported article falls down increases in transporting the article, for example, a cup or the like, which is vertically long and is likely to fall down.

Next, in response to the operation of an operator or the like, the transport instruction computer 3 transmits to the transported article supply equipment 1 and to the robot 2 a signal indicative of a delivery instruction, and at the same time it transmits to the robot 2 an information indicative of the contents of a transported article and the position of a delivery destination (Step 52). Upon receipt of this signal, the robot 2 starts to move to the transported article supply equipment 1 (Step 53), and at the same time the transported article supply equipment 1 also starts to prepare for installing the transported article onto the robot 2 (Step 54). Here, this preparation indicates a series of operations of: grasping the transported article with the hand 22 based on the transported article position 447, etc.; and moving the hand 22, in advance, to a position in which the installation may be carried out as soon as the robot 2 arrives. In the case where the transported articles are drinks, the operations of filling a cup with a drink, closing a lid, and the like are also included.

When the robot 2 reached the transported article supply equipment 1 (Step 55), the transported article supply equipment 1 installs the transported article onto the tray 35 by controlling the hand 22 (Step 56).

Once the transported article is installed, the robot 2 will move to a delivery destination (here, to the transport instruction computer 3) (Step 57), and when it reached the delivery destination (Step 58), an operator or the like will receive the transported article (Step 59). Then, the robot 2 returns to an initial position (Step 60).

The delivery destination may be other place than the transport instruction computer 3.

Figure 6:
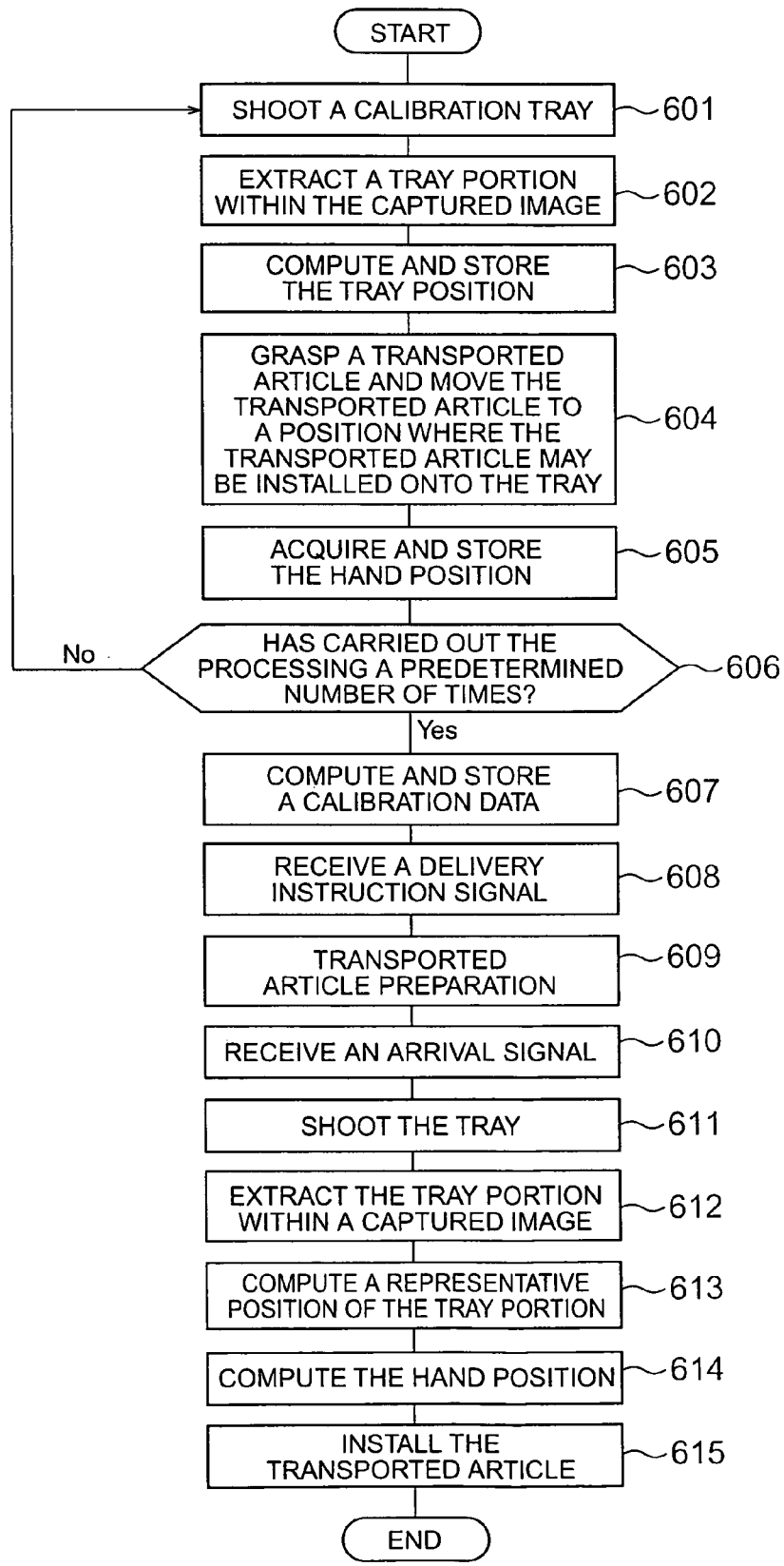
FIG. 6 is a flow chart of the transported article supply equipment 1.

FIG. 6 is the flow chart of the transported article supply equipment 1.

In calibration (Step 51 of FIG. 5), first, a tripod or the like, to which a tray of the same height as the tray 35 of the robot 2 is fixed and which has a calibration tray installed thereon, is prepared in the predetermined arrival area 25 in advance. The one to which the tray is fixed may be a tripod or may be the robot 2 as long as it may reproduce the height of the tray 35. Moreover, as for the tray and the transported article described above, it is desirable that the ones actually to be in use are used. Moreover, for ease of recognition, it is desirable to use a tray, to which the processing of coloring a tray with a constant color or giving a mark thereto in advance, or the like, is carried out.

The shooting part 431 shoots the calibration tray by controlling the camera 23 and stores this shot image to the memory device 43 as the captured image 442 (Step 601).

Next, the extraction part 432 extracts the tray portion within this captured image 442 (Step 602), and the tray position computing part 433 computes a representative position of the extracted tray portion (e.g., the center of a circle if the tray is circular) as the tray position 443, and stores this position to the memory device 43 (Step 603). The tray position 443 to be stored is a two-dimensional coordinate value in the camera coordinate system and is expressed as $m_i=(x_i, y_i, 1)^t$. The tray position is expressed as $P_i=(X_i, Y_i, 1)^t$ in the world coordinate system, where t denotes a transposed matrix.

Here, in this embodiment, the world coordinate system, the camera coordinate system, and the hand coordinate system are used. The world coordinate system expresses a three-dimensional coordinate system when a certain place in real space is made to be the point of origin. The camera coordinate system expresses a two-dimensional coordinate system when a certain place in the captured image is made to be the point of origin. The hand coordinate system expresses a three-dimensional coordinate system when a certain place in the hand 22 is made to be the point of origin.

In this embodiment, assume that the tray moves only in the horizontal direction relative to a floor surface, because the height of a tray on the robot is kept constant and the robot moves on the floor.

Next, the drive part 434 causes the hand 22 to grasp a transported article used for calibration, and an operator or the like, while checking the position, moves the hand to a position where this transported article may be installed precisely on the tray set in the predetermined arrival area 25 (Step 604), and the hand position acquisition part 435 acquires the hand position 444 at this time and stores this to the memory device 43 (Step 605). The hand position 444 to be stored is a three-dimensional coordinate value in the hand coordinate system and is expressed as $q_i=(qx_i, qy_i, qz_i)^t$.

The computing of the tray position 443 and the hand position 444 needs to be repeated a plurality of times at a different tray position $P_i=(X_i, Y_i, 1)^t$. That is, after Step 605, it is determined whether or not the number of times of computing and storing of the tray position 443 and the hand position 444 has reached a predetermined number of times (four times in this embodiment), and if it has not reached, then the process returns to Step 601, and if it has reached, then the process moves to Step 607 (Step 606). In returning to Step 601, an operator or the like moves the calibration tray to any different position $p_i$ within the predetermined arrival area 25 while keeping the height being fixed.

Next, the calibration part 435 computes the calibration data 445 and stores this data to the memory device 43 (Step 607).

As for the computing of the calibration data, the following calculations are carried out. First, from four sets of parameters $\{q_i, m_i\}$ (i=1, 2, 3, 4), a matrix B which satisfies Equation 1 is computed.

$$q_i \approx Bm_i \quad \text{(Equation 1)}$$

The symbol connecting between the left part and the right part in Equation 1 is an equal sign denoting that vectors of the both sides are equal with the freedom of multiplication by scalars being left. Because Matrix B is expressed as follows, there are actually eight unknowns in Equation 1.

$$B = \begin{pmatrix} b_1 & b_2 & b_3 \\ b_4 & b_5 & b_6 \\ b_7 & b_8 & 1 \end{pmatrix}$$

On the other hand, from one equation (Equation 1) obtained from a combination of one corresponding $q_i$ and $m_i$, two linear equations are obtained. Accordingly, eight unknown parameters may be uniquely determined if four sets of combination of $q_i$ and $m_i$ are obtained.

However, only with $b_1$-$b_8$ the vectors of the both sides of Equation 1 still have the freedom of multiplication by scalars, and a constraint is therefore added that all the $q_i$'s exist in the same plane. Because the tray moves only horizontally relative to the floor surface, $P_i$ moves only on the same plane and therefore all the qi's also move on the same plane. If a plane composed of $q_i$ is expressed with an equation, a following equation is shown.

$$(q_i, h) = g$$

Here, h denotes a unit vector indicative of the normal line of the plane composed of $q_i$, and g denotes a scalar indicative of the distance between the plane composed of $q_i$ and the point of origin in the world coordinates, where h and $q_i$ are unknown, respectively. Then, for example, with the use of $q_i$ (i=1, 2, 3), Equation 2 and Equation 3 are calculated.

$$h = q_2 \times q_3 - q_2 \times q_1 - q_1 \times q_3 \quad \text{(Equation 2)}$$

$$g = -(q_2, q_1 \times q_3) \quad \text{(Equation 3)}$$

B calculated from Equation 1, h calculated from Equation 2, and g calculated from Equation 3 correspond to the calibration data.

Steps 601-607 correspond to Step 51 of FIG. 5.

Next, when the signal receiving part 438 receives from the transport instruction computer 3 a signal indicative of a delivery instruction (Step 608), the transported article preparation part 440 will prepare for installing the transported article (Step 609, Step 54).

When the signal receiving part 438 receives an arrival signal from the robot 2 (Step 610), the shooting part 431 will shoot the tray 35 installed on the robot 2 with the camera 23 (Step 611), and the extraction part 432 extracts the tray portion from this captured image 442 (Step 612). The tray position computing part 433 computes the tray position m=(x, y, 1)$^t$ within the captured image 442 (Step 613). The hand position acquisition part 435 uses this m, and B, h and g obtained at Step 607, as an input, and computes the hand position q from a following equation (Step 614).

$$q = \frac{g}{(h, Bm)} Bm$$

Accordingly, the operation of the hand 22 at the time of installing the transported article onto the tray is determined.

Next, the transported article installing part 441 opens the finger portion to release the grasped transported article at a position indicated by the computed q (Step 615).

Figure 7:
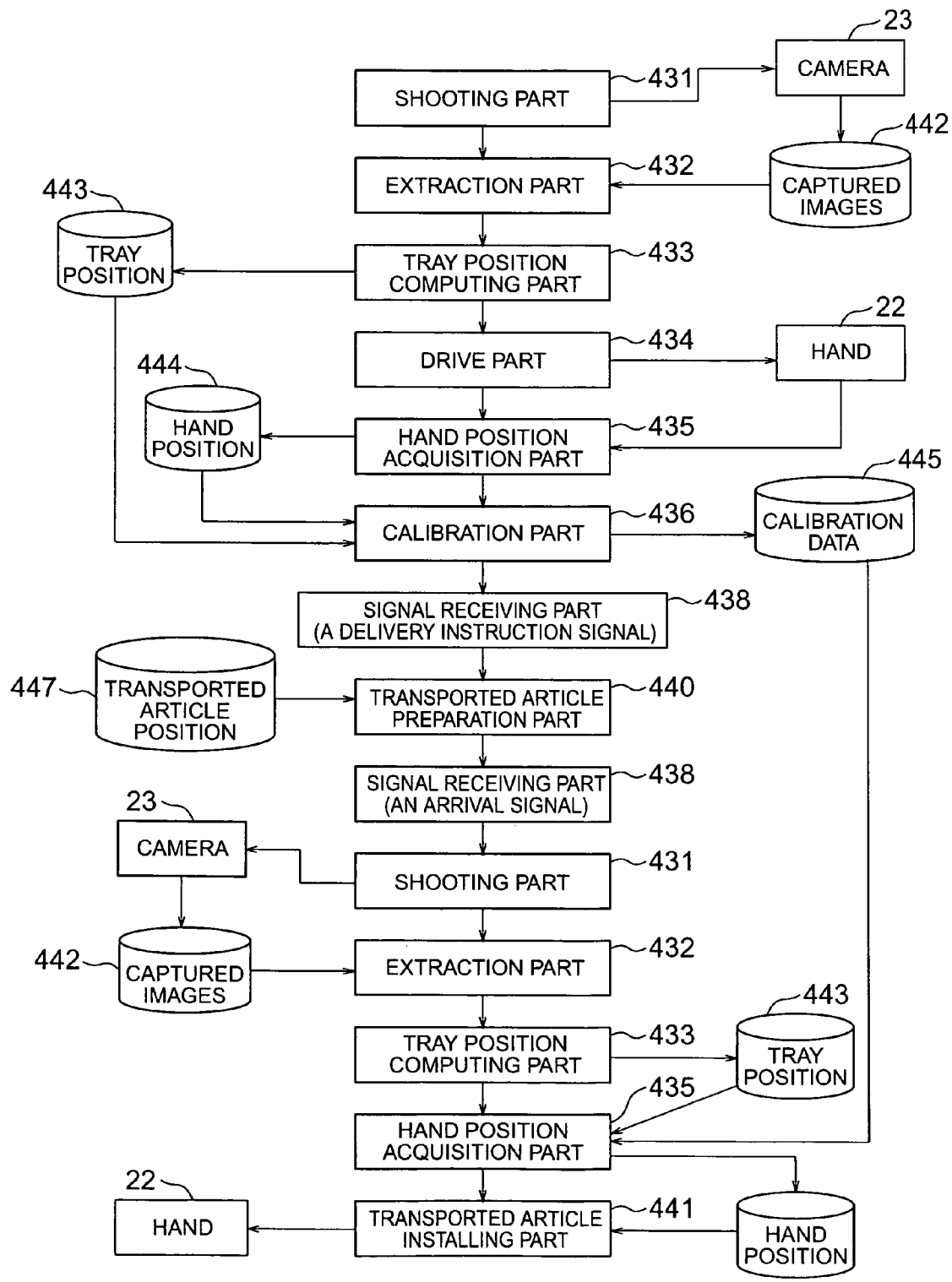
FIG. 7 is a flow chart of functional modules of the transported article supply equipment 1.

FIG. 7 is a view showing the flow of function modules of the transported article supply equipment 1. The detailed description is omitted due to the duplication with the description of FIG. 6.

Figure 8:
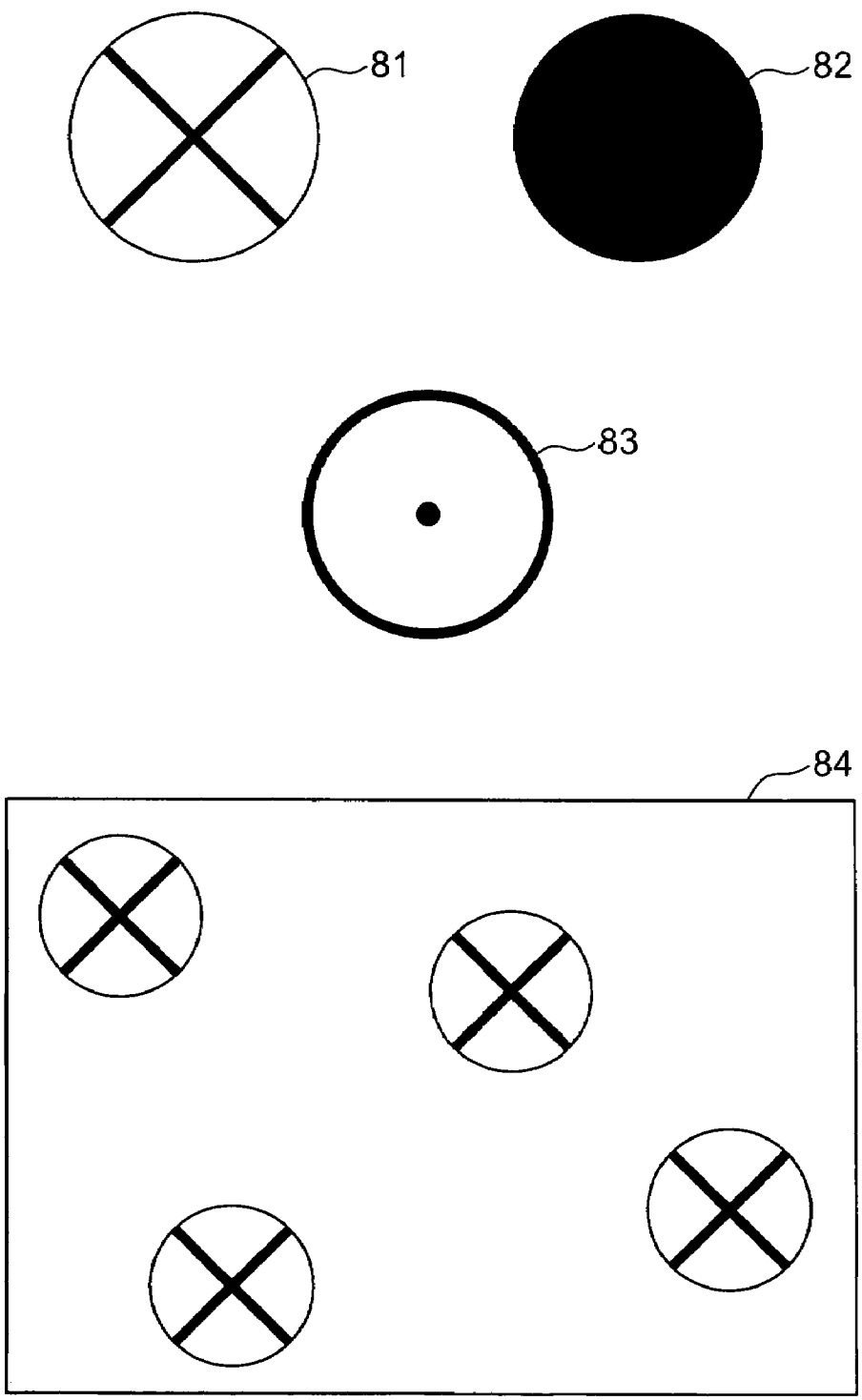
FIG. 8 is a view showing examples of processing transported articles.

FIG. 8 is a view showing examples of processing the tray.

The use of a tray 81 in which an easy to recognize pattern is drawn, or a tray 82 colored with a constant color, or a tray 83 in which a dot is added at the center thereof would facilitate the recognition.

Moreover, in order to express a tray at four different places of the same height relative to the floor surface, one piece of plate without deformation in which a tray pattern is drawn may be used. For example, a plate 84, in which the tray with a pattern shown in reference numeral 81 is drawn at four placed on the plate, may be used.

Figure 9:
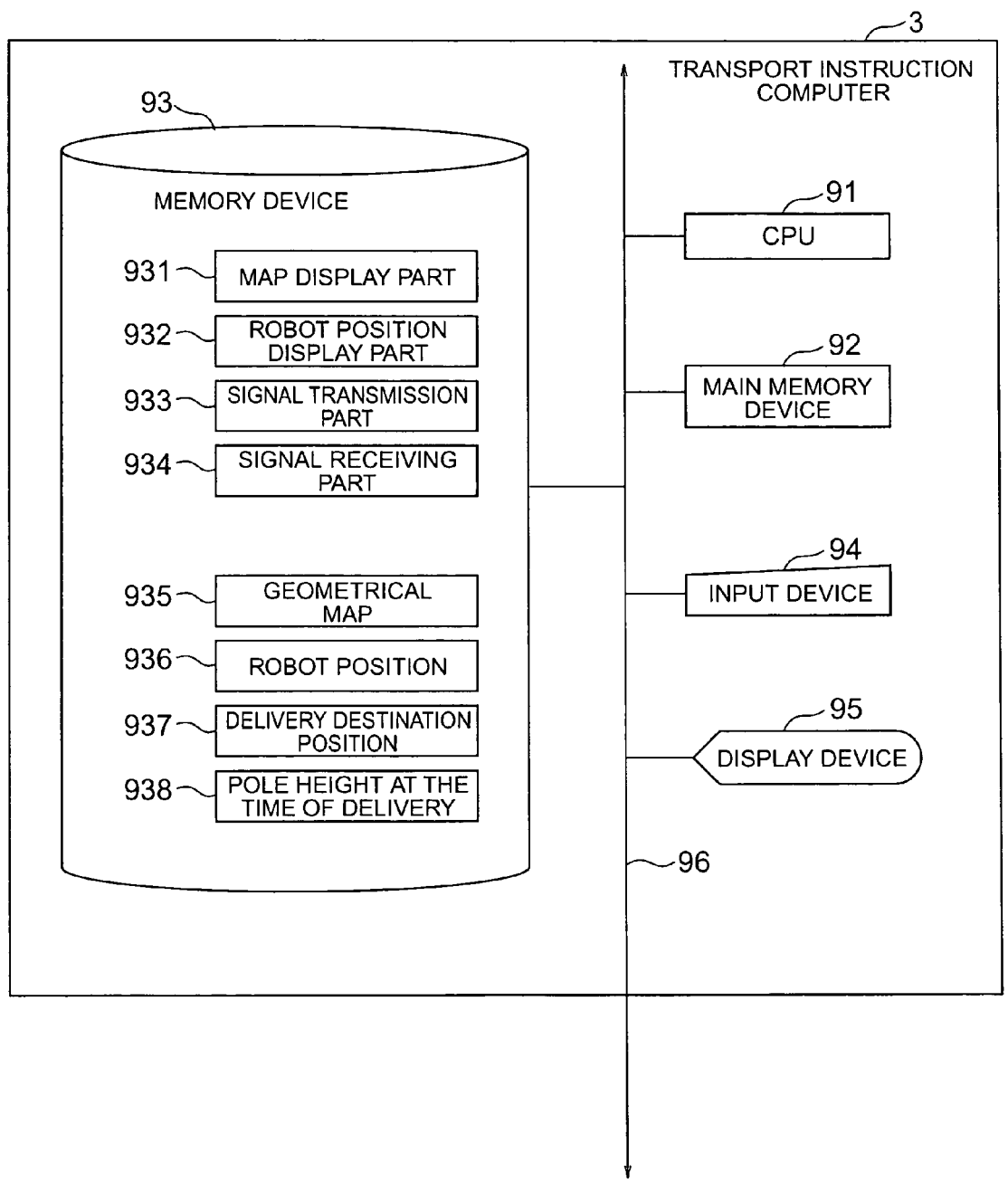
FIG. 9 is a view showing the hardware configuration of a transport instruction computer 3.

FIG. 9 is a view showing the hardware configuration of the transport instruction computer 3.

The transport instruction computer 3 comprises an input device 94 and the display device 95 in addition to a CPU 91, a main memory device 92, a memory device 93, and a bus 96.

The memory device 93 stores programs such as: a geometrical map display part 931 for displaying a geometrical map 935 (to be described later), a robot position display part 932 which displays the position on the geometrical map 935 whenever the robot 2 moves, a signal transmission part 933 for transmitting various signals, and a signal receiving part 934 for receiving various signals. The memory device 93 further stores data such as: a geometrical map 935 for showing a geometrical map of the environment in which the robot 2 moves, a robot position 936 indicative of the position of the robot 2 on the geometrical map 935, a delivery destination position 937 indicative of the position of a delivery destination, a pole height at the time of delivery 938 indicative of the height of the pole 34 at the time of delivery.

In addition, the geometrical map 935 is an integration of the distance information which the robot 2, after acquiring the distance information by means of the sensor 32 while moving in the travelable places in a room, acquired at each position. The delivery destination position 937 may be stored to the memory device in advance, or provision may be made such that this position may be clicked on the geometrical map 935 from the input device 94, the geometrical map being displayed on the display device 95. Moreover, also for the pole height at the time of delivery 938, the height data may be stored to the memory device in advance if a desired height is already determined, or it may specified from the input device 94.

Figure 10:
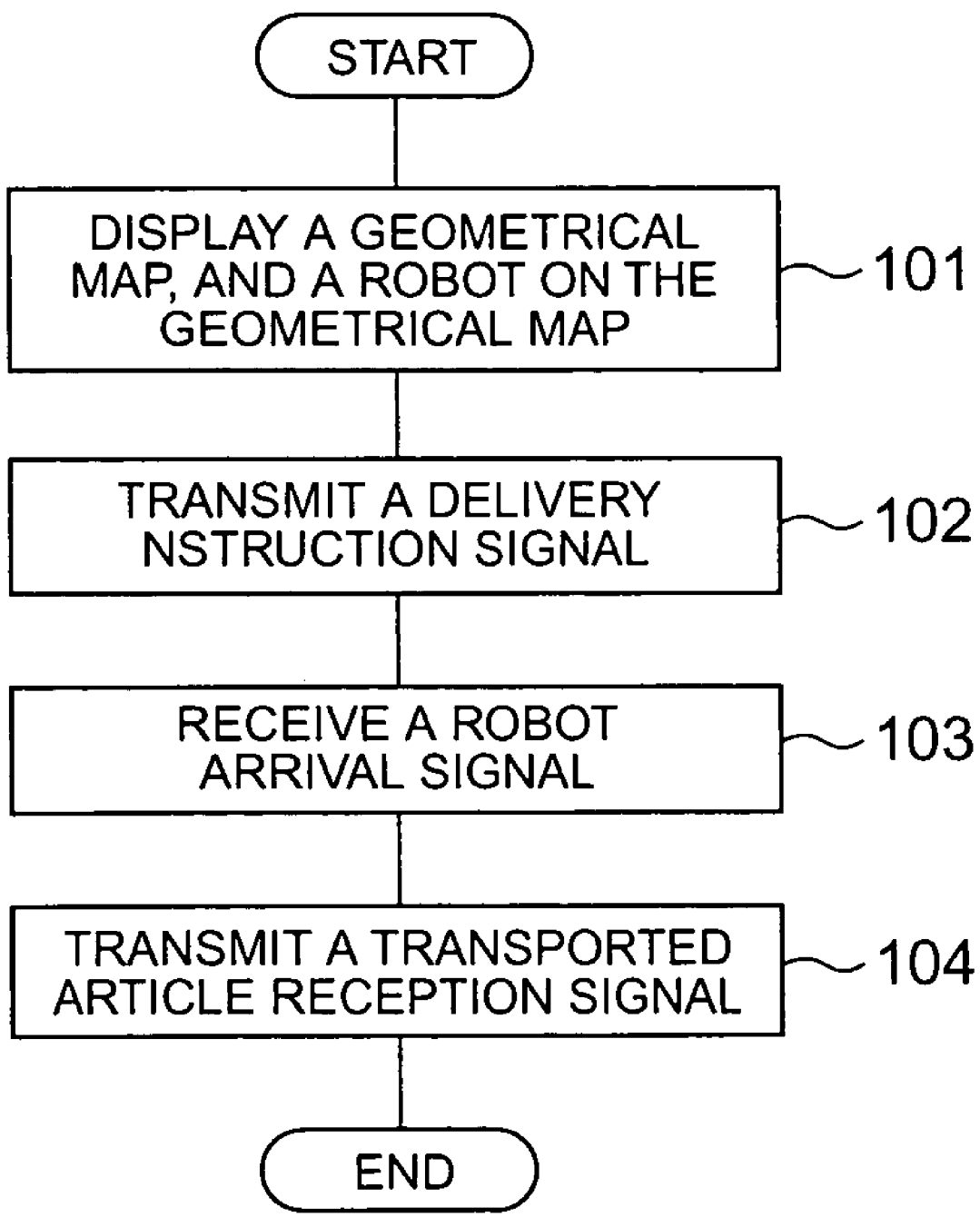
FIG. 10 is a flow chart of the transport instruction computer 3.

FIG. 10 is the flow chart of the transport instruction computer 3.

Upon activation of an application for requesting a delivery, the geometrical map display part 931 displays the geometrical map 935 on the display device 95, and the robot position display part 932 displays the robot position 936 at the corresponding position on the geometrical map 935 (Step 101).

Next, the signal transmission part 933 transmits a delivery instruction signal based on an instruction (a button corresponding to the delivery is pushed down, or the like) inputted from the input device 94 (Step 102). This signal is transmitted to the computer 21 of the transported article supply equipment 1 as well as to the robot computer 33. Moreover, to the robot computer 33, the delivery destination position 937 and the pole height at the time of delivery 938 are also transmitted.

After the robot 2 transported the transported article to the delivery destination, the signal receiving part 934 receives an arrival signal of the transported article from the robot 2 (Step 103), and informs an operator or the like of a fact that the transported article has arrived (by displaying a window for informing of the arrival, or by enabling the sound, or the like). Upon receipt of the transported article, the signal transmission part 933 transmits a reception signal of the transported article to the robot 2 based on an instruction inputted from the input device 94 (a button corresponding to the receipt is pushed down, or the like) (Step 104).

Figure 11:
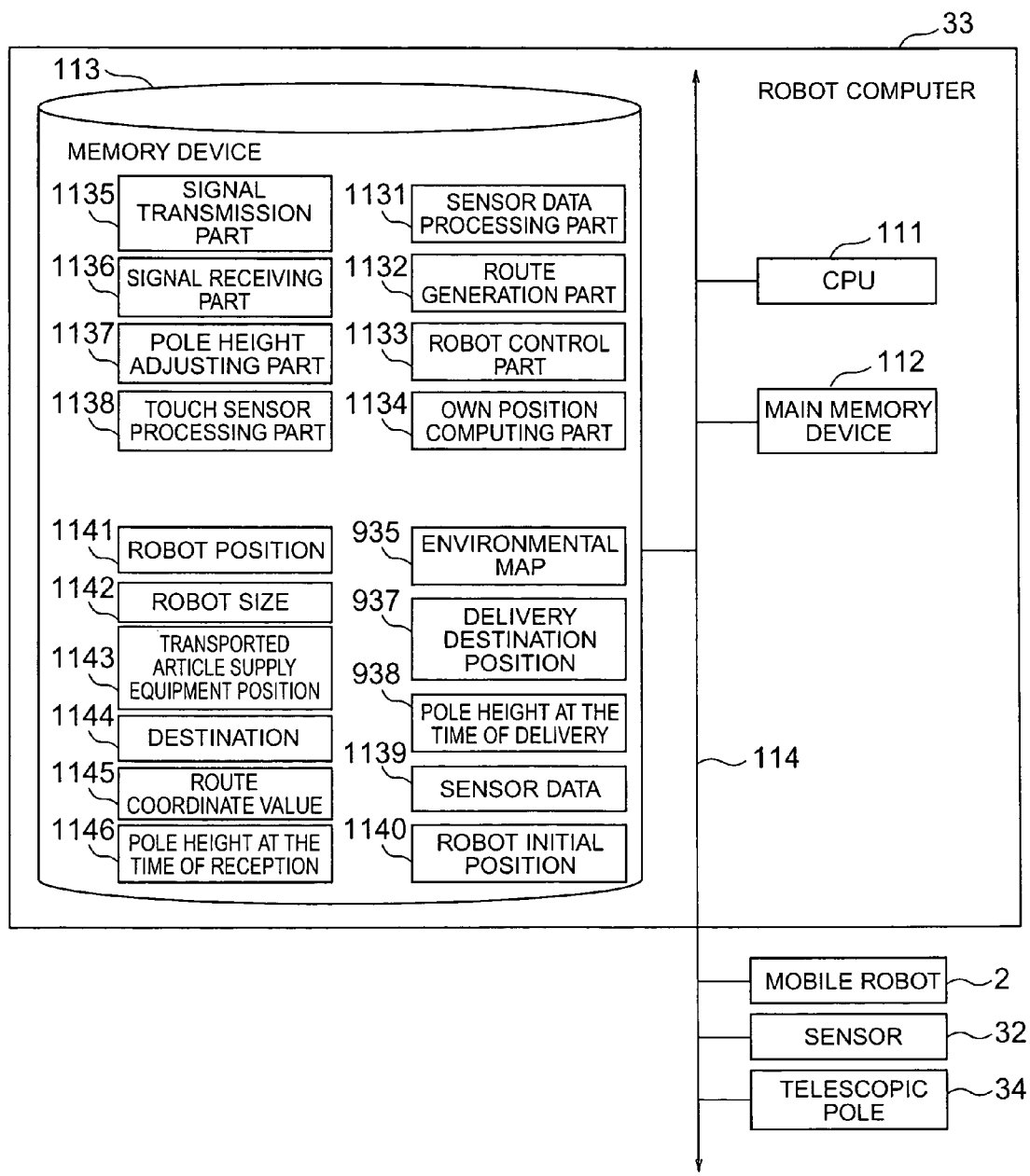
FIG. 11 is a view showing the hardware configuration of a robot computer 33.

FIG. 11 is a view showing the hardware configuration of the robot computer 33.

CPU 111, a main memory device 112, a memory device 113, the movable cart 31, the sensor 32, the pole 34, and the like are coupled via a bus 114.

The memory device 113 stores programs such as, a sensor data processing part 1131 for processing a sensor data 1139 (to be described later), a route generation part 1132 for generating a travel route of the robot 2, a robot control part 1133 for controlling so as to move the robot 2 to a coordinate value to which the robot 2 should proceed next in accordance with the route coordinate value 1145, an own position computing part 1134 for computing the current position of the robot 2, a signal transmission part 1135 for transmitting various signals, a signal receiving part 1136 for receiving various signals, a pole height adjusting part 1137 for adjusting the height of the pole, and a touch sensor processing part 1138 (to be described later). The memory device 113 further stores, in addition to the geometrical map 935, the delivery destination position 937, and the pole height at the time of delivery 938, which are the same data as those of FIG. 9, data such as: a sensor data 1139 indicative of the distance information between the robot 2 and a surrounding obstacle, the distance information being received from the sensor 32; a robot initial position 1140 indicative of the initial position of the robot 2, a robot position 1141 indicative of the position of the robot 2 on the geometrical map 935; a robot size 1142 indicative of the size of the robot 2; a transported article supply equipment position 1143 indicative of the position of the transported article supply equipment 1; a destination 1144 indicative of the position of a destination at the time of generating the travel route of the robot 2; a route coordinate value 1145 indicative of a route to which the robot 2 proceeds (the coordinate values of a group of points are recorded sequentially); and a pole height at the time of reception 1146 indicative of the height of the pole in receiving a transported article from the transported article supply equipment 1.

In addition, in the route generation, the routes which need to be generated are the following three routes: a route from the robot initial position 1140 to the transported article supply equipment position 1143, a route from the transported article supply equipment position 1143 to the delivery destination position 937, and a route from the delivery destination position 937 to the robot initial position 1140. Then, the route generation part 1132 generates a group of route points of the shortest route on the geometrical map 935 using the coordinate value of a starting place, the coordinate value of a delivery destination, and the robot size, as an input, and stores the same to the memory device 113 as the route coordinate value 1145. Moreover, the robot control part 1133 may also limit the travelable routes of the robot depending on the robot size 1142. Moreover, the own position computing part 1134 carries out matching between the sensor data 1139 obtained from the sensor 32 and the geometrical map 935, as needed, and computes the own current position to update the robot position 1141. Moreover, as for the destination 1144, an appropriate value among the transported article supply equipment position 1143, the delivery destination position 937, and the robot initial position 1140 is used corresponding to the respective movements.

Figure 12:
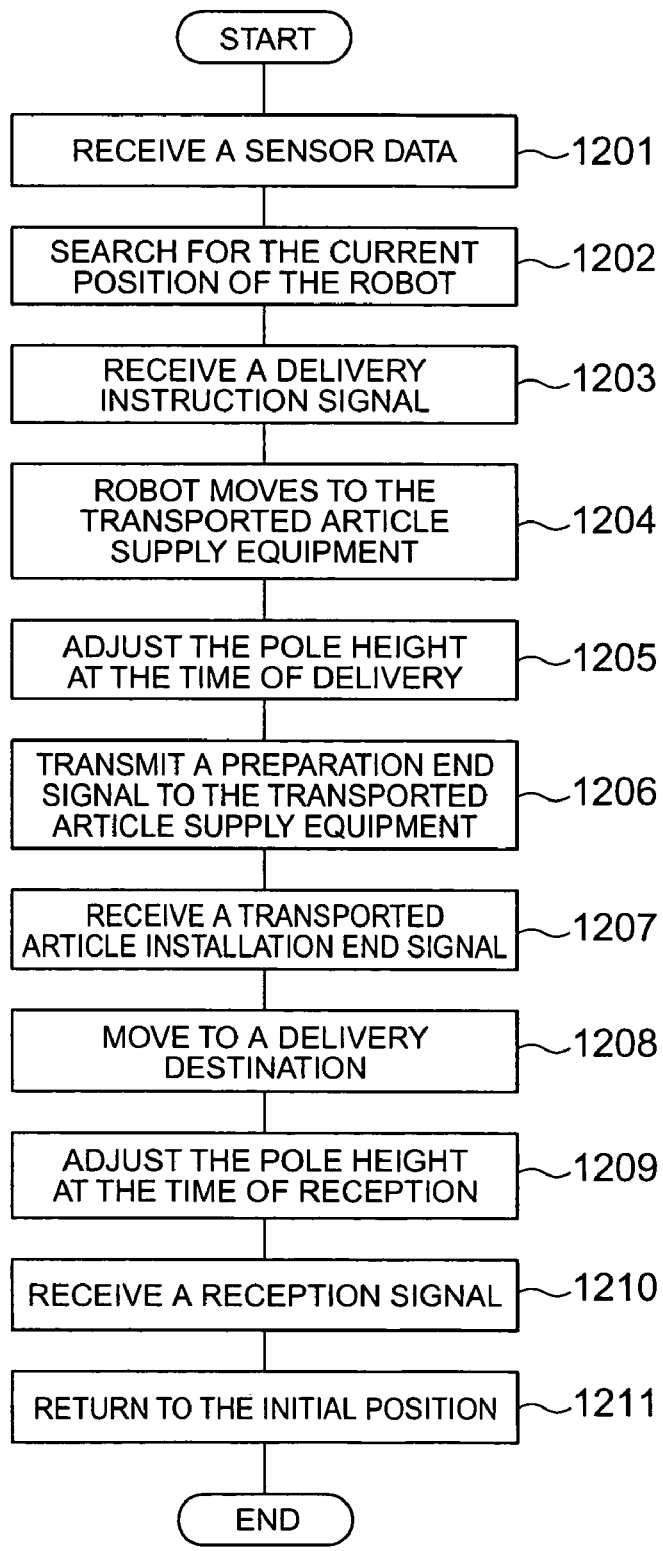
FIG. 12 is a flow chart of the robot computer 33.

FIG. 12 is a view showing the flow of the robot computer 33.

First, the sensor data processing part 1131 receives the sensor data 1139 by controlling the sensor 32 (Step 1201).

Next, the own position computing part 1134 searches precisely at which position the robot 2 is located (Step 1202). Specifically, the own position computing part 1134 searches for a matching place by carrying out the matching between the sensor data 1139 obtained earlier and the geometrical map 935 obtained by the sensor 32 in advance, and stores to the memory device 113 the matched place as the robot position 1141, and transmits this robot position 1141 to the transport instruction computer 3.

Upon receipt of a delivery instruction signal transmitted from the transport instruction computer 3, the signal receiving part 1135 stores to the memory device 113 the delivery destination position 937 and the pole height at the time of delivery 938 which are transmitted at the same time (Step 1203), and the robot control part 1133 moves the robot 2 in accordance with the route to the transported article supply equipment 1, the route being generated by the route generation part 1132 (Step 1204).

When the robot 2 reached the transported article supply equipment 1 which is a first destination, the pole height adjusting part 1137 expands the pole 34 to the height of a value of the pole height at the time of reception 1146 (Step 1205), and the signal transmission part 1136 transmits to the transported article supply equipment 1 a signal indicative of being ready for receiving the transported article (Step 1206).

Upon receipt of a robot arrival signal, the transported article supply equipment 1 installs the transported article onto the tray 35 on the pole 34 by controlling the hand 22, and when the signal receiving part 1136 received a signal informing of the end of installing the transported article from the transported article supply equipment 1 (Step 1207), the height of the pole is returned to the original shortest state, and the robot control part 1133 moves the robot 2 to a delivery destination based on the route which the route generation part 1132 generated (Step 1208). The robot moves after returning the height of the pole to the shortest state, so that the transported article is transported in as stable condition as possible by avoiding collision with a surrounding obstacle as much as possible during the move.

When the robot 2 reached the delivery destination which is a second destination, the pole height adjusting part 1137 expands the pole 34 to the height of a value of the pole height at the delivery destination 938 (Step 1209), and the signal transmission part 1135 transmits to the transport instruction computer 3 a signal informing of a fact that the delivery article has arrived.

Upon receipt of the signal informing of the fact that the delivery article has been received at the delivery destination (Step 1210), the robot control part 1133 returns the height of the pole to the original shortest state and moves the robot 2 to the original position (Step 1211).

Figure 13:
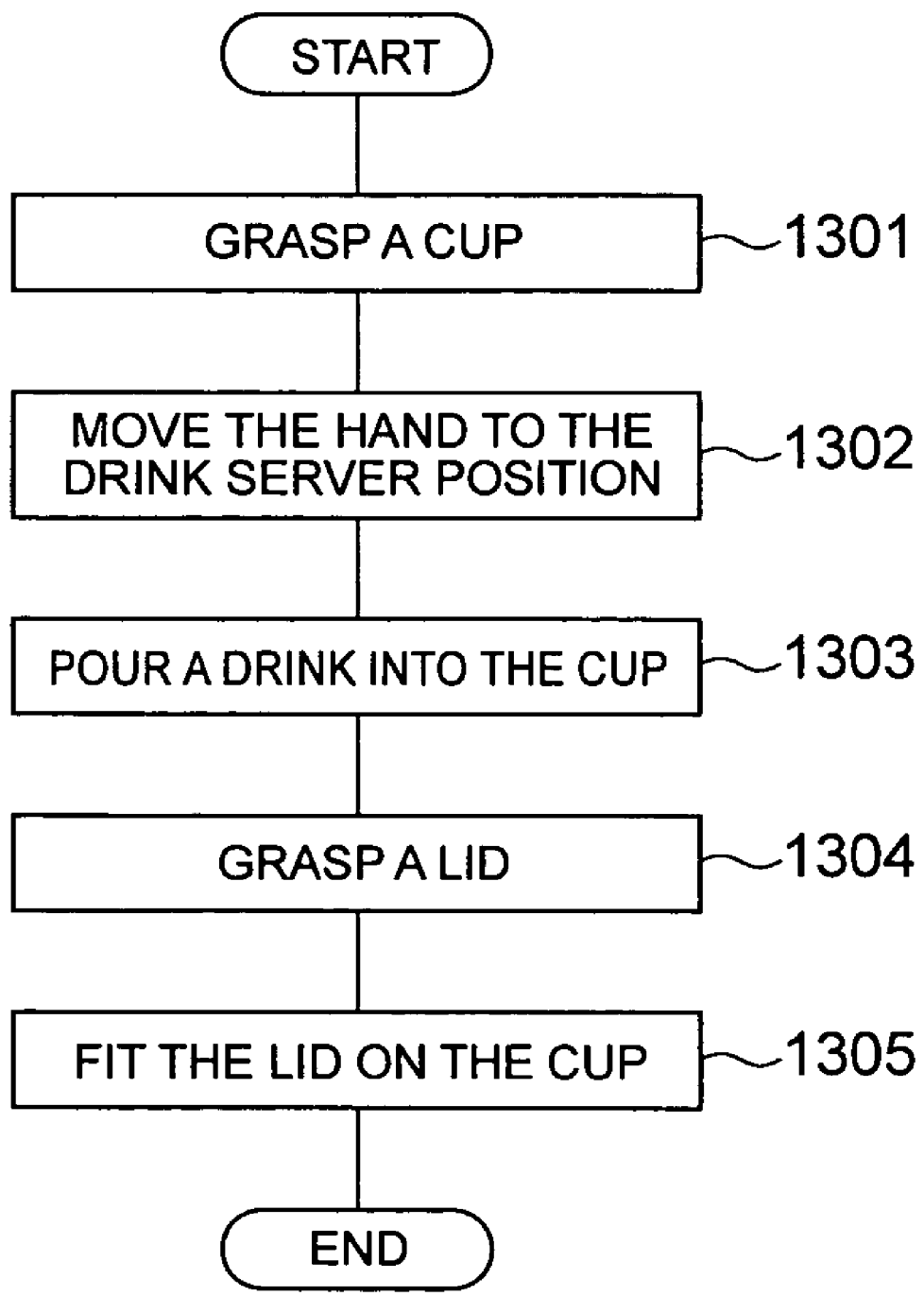
FIG. 13 is a flow chart of a transported article preparation part 440 when the transported articles are drinks.

FIG. 13 is a flow chart of the transported article preparation part 440 (FIG. 4) in the case where the transported articles are drinks.

First, the cup acquisition part 4401 controls so as to moves the hand 22 to the cup waiting position and grasp a cup by closing the finger portion of the hand 22 (Step 1301). For the amount of movement of the finger portion at this time, a value of a hand pressure value 452 at the time of grasping an empty cup is used.

Next, the cup installing part 4402 moves an empty cup to the transported article server position from the cup waiting position while grasping the empty cup with the hand 22 (Step 1302).

Next, the drink pouring part 4403 carries out an operation of pouring a drink of the transported article server 24 with the hand 22 (Step 1303). For example, this operation includes pushing down a button, or lowering a lever, or the like.

After having finished pouring a drink, the cup lid acquisition part 4404 controls so as to move the hand 22 to the lid waiting position and grasp a lid by closing the finger portion of the hand 22 (Step 1304). As for the amount of movement of the finger portion at this time, a value of the hand pressure value 452 at the time of grasping the lid is used.

Next, the cup lid fitting part 4405 controls so as to move the hand 22 from the lid waiting position to above the cup filled with a drink, the cup being located at the transported article server position, while grasping the lid with the hand 22, and open the finger portion of the hand 22 to release the lid, and move the finger portion of the hand 22 as to be horizontal relative to the upper part of the lid, and fit the lid on the cup by changing the width and pressing from the above several times (Step 1305).

Figure 14:
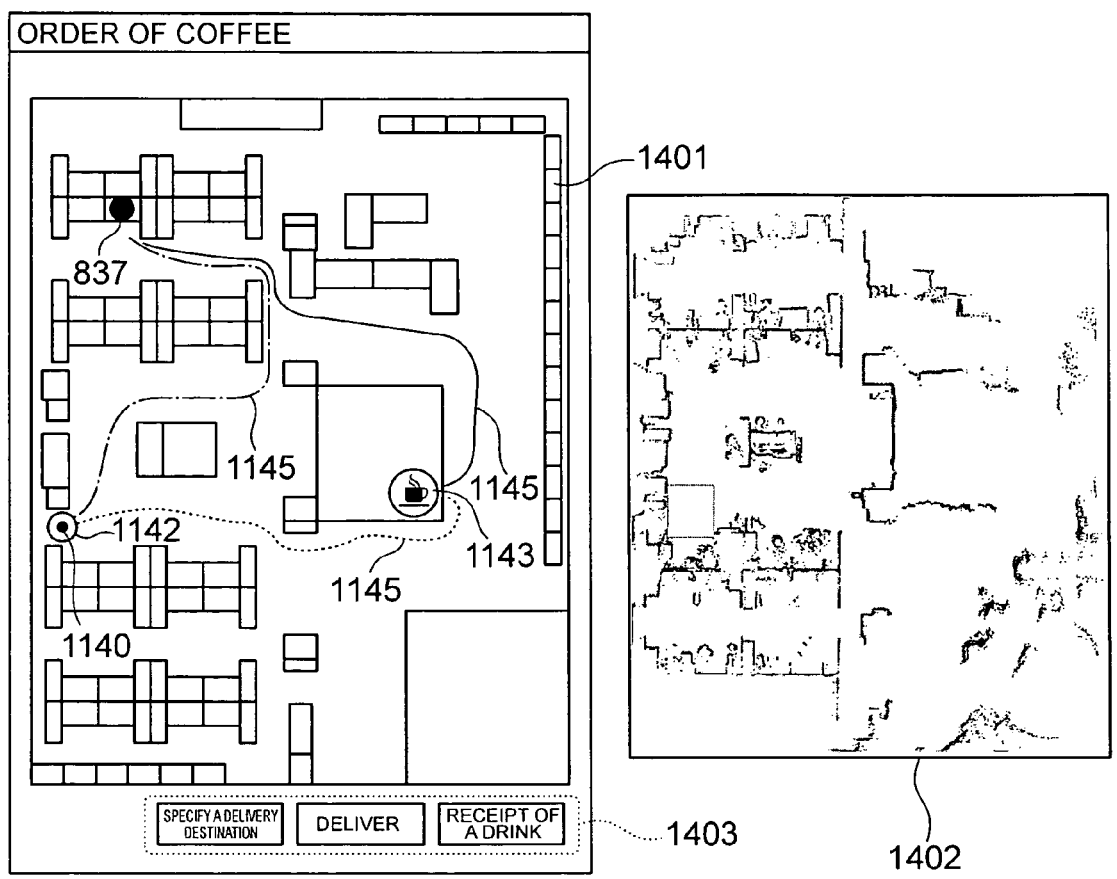
FIG. 14 shows examples of the screen of a display device 95 of the transport instruction computer 3.

FIG. 14 is examples of the screen of the display device 95 of the transport instruction computer 3.

The geometrical map 935 would be understood easily if the geometrical map and a layout of a room are superimposed and displayed. Reference numeral 1401 portion shows a superimposition of the geometrical map and the layout of the room, and reference numeral 1402 portion shows a data in which only the geometrical map is extracted. Moreover, on the geometrical map there are displayed the transported article supply equipment position 1143, the robot position 1140, the delivery destination position 937, the robot size 1142, and a route 1145 interpolating between a start point and goal point of the robot.

In reference numeral 1403 portion is displayed a button for transmitting a delivery instruction signal to the robot 2 and the transported article supply equipment 1, a button for specifying a delivery destination position, a button for transmitting to the robot 2 a fact that the transported article has been received, and the like.

In addition, in the embodiment described above, the description has been made in which the detection of the arrival of the robot 2, the detection of the installation and receipt of a transported article, and the like are carried out by receiving signals from other computer, however, the embodiment is not limited thereto. For example, the detection of the arrival of the robot 2 may be also carried out using the camera 23. In this case, the arrival determining part 439 compares the captured image 442 with the tray image 447 and determines that the robot 2 has arrived if the tray 35 rested. Moreover, in the detection of the installation of a transported article, or the like, a touch sensor may be also used. In this case, a touch sensor is installed in the bottom portion of the tray 35 in advance, and the touch sensor processing part 1138 determines whether or not a transported article has been installed onto the tray 35. Moreover, the sensor for determining the presence of a transported article is not limited to the touch sensor, and a laser sensor, a camera, or the like may be used.

The present invention may provide a system capable of installing a transported article onto a robot without through man power, the robot causing an error at its arrival position.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A transport system comprising a mobile robot, and a computer coupled to a camera and a hand robot, wherein the computer comprises:

a shooting part which shoots a first calibration tray by controlling the camera;

a tray position computing part which computes a tray position of the first calibration tray within a captured image which the shooting part shot;

a hand position acquisition part which acquires a hand position, the hand position indicative of the position of the hand robot of when the hand robot installs onto the first calibration tray a first transported article used for calibration;

a calibration part which computes a calibration data based on the tray position and the hand position; and a transported article installing part which, when the mobile robot reached a predetermined arrival area, controls, based on the calibration data, the hand robot so as to install a second transported article onto a second tray, the second tray which the mobile robot being provided with.

2. The transport system according to claim 1,
wherein the shooting part, the tray position computing part, and the hand position acquisition part carry out the processing a predetermined number of times, and
wherein the calibration part computes the calibration data based on the tray position and hand position of the predetermined number of times.

3. The transport system according to claim 1,
wherein the computer further comprises a signal receiving part for receiving an arrival signal transmitted from the mobile robot, and
wherein when the arrival signal is received, the transported article installing part determines that the mobile robot has reached the predetermined arrival area.

4. The transport system according to claim 1, wherein the calibration data is a data for calculating a relative relationship between a camera coordinate system and a hand robot coordinate system.

5. The transport system according to claim 1, wherein the first calibration tray is colored.

6. The transport system according to claim 1, wherein the mobile robot comprises:
a sensor;
a geometrical map;
a route generation part for generating a travel route on the geometrical map; and
a robot control part which controls the mobile robot so as to move based on a distance information obtained from the sensor, the geometrical map, and the travel route.

7. The transport system according to claim 6, wherein the travel route generation part generates the travel route by using a start point and goal point of the mobile robot, and the size of the mobile robot, as an input.

8. The transport system according to claim 1, wherein the computer further comprises an arrival determining part, which compares the captured image with the tray image and determines that the mobile robot has reached the predetermined arrival area when the tray rested within the captured image.

9. The transport system according to claim 1, wherein the mobile robot further comprises:
a touch sensor; and
a sensor data receiving part for determining based on the touch sensor that the second transported article has been installed onto the second tray.

10. A computer coupled to a camera and a hand robot, the computer, comprising:
a drive part for controlling the hand robot so as to install onto a first calibration tray a first transported article used for calibration;
a shooting part for controlling the camera so as to shoot the first calibration tray of when the hand robot installs the first transported article onto the first calibration tray;
a hand position acquisition part for acquiring a hand position indicative of a position of the hand robot of when the hand robot installs the first transported article onto the first calibration tray;
a tray position computing part for computing a tray position of the first calibration tray within the captured image which the shooting part shot;
a calibration part for computing a calibration data based on the tray position and the hand position; and
a transported article installing part which, when the mobile robot reached a predetermined arrival area, controls, based on the calibration data, the hand robot so as to install a second transported article onto a second tray, the second tray which the mobile robot being provided with.

* * * * *